United States Patent [19]

Irie et al.

[11] Patent Number: 5,710,467
[45] Date of Patent: Jan. 20, 1998

[54] ALTERNATOR

[75] Inventors: Hitoshi Irie, Nagoya; Hiroshi Ishida, Anjo; Shin Kusase, Obu, all of Japan

[73] Assignee: Nippondenso Co., Ltd., Kariya, Japan

[21] Appl. No.: 597,223

[22] Filed: Feb. 6, 1996

[51] Int. Cl.[6] .............. H02K 1/32; H02K 9/00; H02K 11/00
[52] U.S. Cl. .................. 310/64; 310/62; 310/68 D
[58] Field of Search .................. 310/68 D, 64, 310/62, 63; 363/141, 145

[56] References Cited

U.S. PATENT DOCUMENTS

| | | | |
|---|---|---|---|
| 3,198,972 | 8/1965 | Larson | 310/68 D |
| 4,418,295 | 11/1983 | Shiga | 310/59 |
| 4,419,597 | 12/1983 | Shiga et al. | 310/68 D |
| 4,794,285 | 12/1988 | Nimura et al. | 310/68 D |

FOREIGN PATENT DOCUMENTS

| | | |
|---|---|---|
| 0 125 834 | 11/1984 | European Pat. Off. . |
| 60-20748 | 2/1985 | Japan . |
| 7-39110 | 2/1995 | Japan . |

*Primary Examiner*—Steven L. Stephan
*Assistant Examiner*—Michael Wallace, Jr.
*Attorney, Agent, or Firm*—Cushman, Darby & Cushman IP Group of Pillsbury, Madison & Sutro LLP

[57] ABSTRACT

Cooling wind is introduced into an electric-parts-chamber through openings formed at the bottom of a cover, then taken into the intake side of a cooling fan through the air intakes formed in the wall end of a housing from the electric-parts-chamber. The cooling wind is accelerated by the fan to be driven off from the outlets formed in the peripheral wall of the housing. The cylindrical portion of the positive side cooling fins of the rectifier is extended to the space between the outer periphery of the fan and the outlets. The inner diameter of the cylindrical portion is longer than that of the rear coil end. Thus, the coil end and the cylindrical portion of the positive side cooling fin are cooled sufficiently by the cooling wind blowing thereon at high speed, so that the rectifier can endure large thermal load with reduced wind noise even if the size of the alternator is small.

14 Claims, 5 Drawing Sheets

ALTERNATOR

BACKGROUND OF THE INVENTION

1. Field of the Invention

The present invention relates to a cooling system of a rectifier of an alternator for a vehicle.

2. Description of Related Art

An alternator disclosed in Japanese Patent Laid-Open Publication No. Sho 60-20748 filed by the same assignee of the present invention comprises a housing which has air intakes on the bottom thereof and air outlets on the circumferential wall thereof, stator coils wound around a stator core fixed in the housing, a rotor core supported rotatably by the housing inside the stator core, a cooling fan located under the outlets and fixed on an end surface of the rotor core to blow the cooling wind in the radial direction, a dish-shaped cover fixed on the end wall of the housing, and such electric parts as a rectifier and the like contained in an electric-parts-chamber formed between the end wall and the cover. Cooling wind flows from air inlets formed in the bottom of the cover to the outlets via the electric-parts-chamber, the air intakes and the cooling fan.

FIG. 5 shows an enlarged view of main parts of a conventional alternator with a built-in rectifier. A rectifier 200, i.e., a three-phase full wave rectifier, is contained in a parts-chamber S between a rear frame 100 and a cover 101. A pipe rivet 103 is fixed on a bolt 102 inserted horizontally from the end wall of the rear frame 100. A bush 104, a positive side cooling fin (a radiating plate) 105, a bush 106, and a negative side cooling fin 107 are mounted on the pipe rivet 103 in this order. Next, a fixing hole of the cover 101 is placed on the bolt 102, which is tightened with a nut 108. Positive rectifying elements (not shown) are fixed in the positive side cooling fin 105 and negative rectifying elements (not shown) are fixed in the negative side cooling fin 107, respectively. These cooling fins 105 and 107 serve as electrode plates connected to one electrode of respective rectifying elements.

The above-mentioned structure allows both positive and negative side cooling fins 105 and 107 to be separated from each other as well as from the frame 100 and the bolt 102. The pipe rivet 103 serves as a ground electrode of the negative side cooling fin 107 and fixes each bush 104 and 106, and each fin 105 and 107.

In the aforementioned conventional alternator, however, because electric parts such as the rectifier and the like are disposed at the intake side of the cooling fan to be cooled by cooling wind taken in by the fan, wind speed is low and cooling efficiency for the rectifier which particularly generates more heat than other electric parts is not sufficient. Thus, operating temperature of such an alternator becomes high.

Moreover, in some cooling structures as disclosed in EP 0125834 and U.S. Pat. No. 3,198,972, the cooling wind blows on the radiating plate of a rectifier. However, in the former one, the distance between the outer diameter of the cooling fan and the radiating plate is so short that it causes increased discharge resistance, lower cooling performance due to reduced amount of the wind, and louder interfering noise by the wind. On the other hand, in the latter one, since the radiating plate is formed in the radial direction, the diameter of its surface area has to be enlarged to raise cooling performance, which results in a larger-sized alternator.

Particularly in case the inner peripheral diameter of the radiating plate is smaller than that of the stator coil end while the inner peripheral diameter of the stator coil (which tends to affect the size of an alternator) is not large enough, discharge resistance of cooling wind to the radiating plate of the heat-generating rectifier increases. Thus, the radiating plate is difficult to be cooled and wind noise also becomes louder.

When the inner peripheral diameters of both the radiating plate and the stator coil end are the same, the wind blowing around the coil end and the window blowing the radiating plate flow in opposite directions and collide with each other, resulting in difficulty of cooling wind discharge and in an adverse effect on cooling performance.

Since the radiating plate is mostly disposed in a radially limited range and located discontinuously in the circumferential direction, not only cooling performance deteriorates but also wind noise becomes louder if the inner periphery of the radiating plate is close to the outer periphery of the cooling fan.

The recent trend to manufacture a smaller-sized alternator generating high output power is apt to worsen the temperature environment of a rectifier and a stator coil. Under such situations, there has been an increasing demand to improve cooling performance as well as noise reduction.

SUMMARY OF THE INVENTION

In light of the above-mentioned problems, the present invention has been made with its primary object to provide an alternator with improved cooling performance of the rectifier without increasing the size of the alternator nor the wind interfering noise.

Another object of the present invention is to provide an alternator which can take in cooling wind from the outside without reducing wind volume or increasing intake resistance.

Another object of the present invention is to provide an alternator with raised raise cooling efficiency effected by forming notches or holes on the radiating plate to face the outlets, thereby to reduce the discharge resistance of the cooling wind.

A further object of the present invention is to provide an alternator which will cool even the radiating plate near the rectifying element generating heat by deflecting cooling wind.

A further object of the present invention is to provide an alternator in which an installation place of a rectifier is easily secured and the radiating plate can be easily cooled with the cooling wind generated by the fan.

According to the present invention, cooling wind passes around the inner periphery of the rectifier to go into the intake of the cooling fan to be accelerated in speed radially and driven from the outlets on the peripheral wall of the housing.

Particularly in the present invention, a sufficiently large space is provided between the outer diameter portion of the fan, i.e., the discharge side of the cooling fan, and the cylindrical extension of the radiating plate and the inner diameter of the stator coil end is shorter than that of the cylindrical extension of the radiating plate, which enables cooling the radiating plate efficiently without either increasing the size of the alternator, reducing the volume of cooling wind blown by the centrifugal fan, or increasing wind noise. The turbulent flow in the aforementioned space further improves the cooling performance of the radiating plate, so that the rectifier can endure a larger thermal load with assured longer life.

Other objects and features of the invention will appear in course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
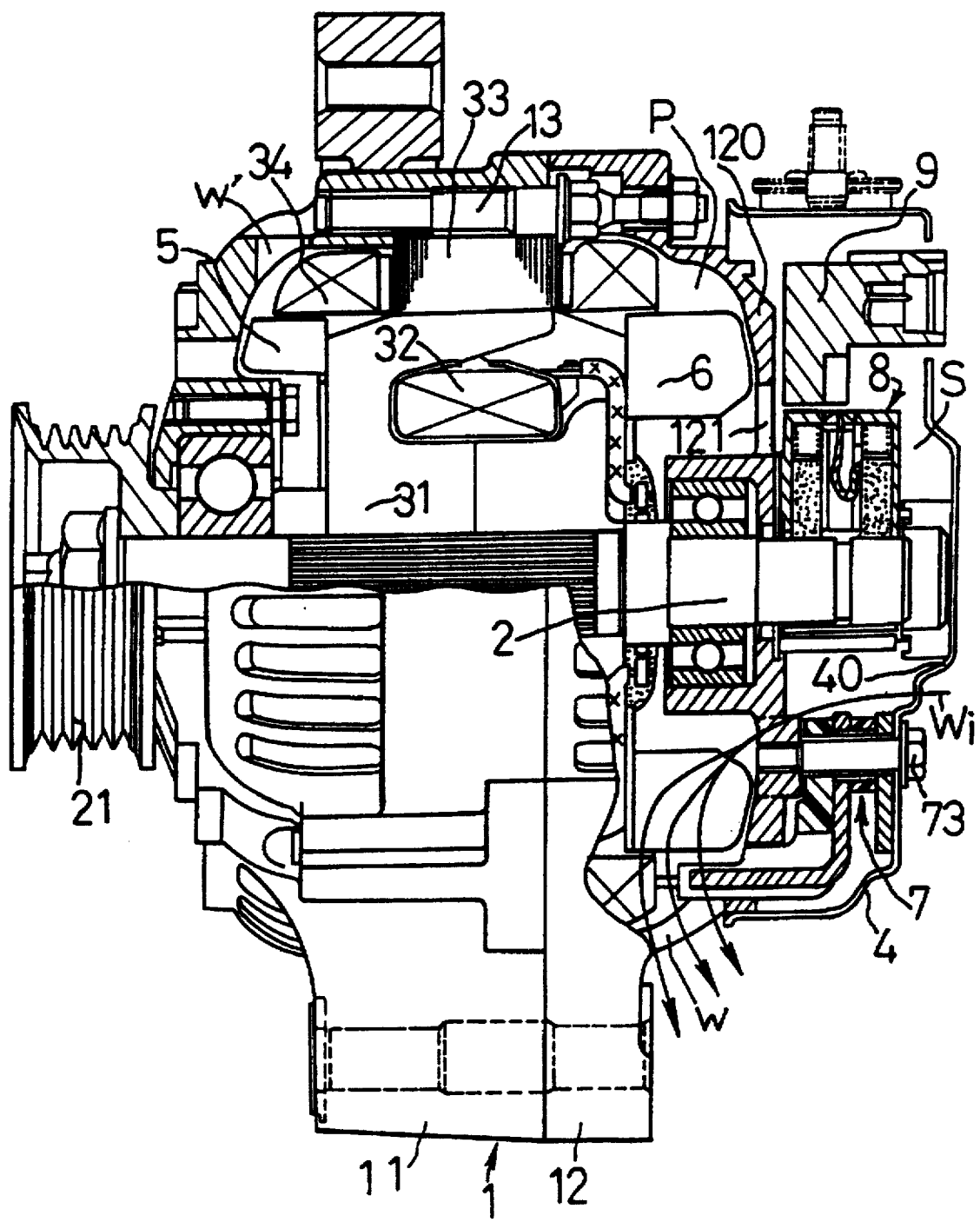
FIG. 1 is a sectional view of an alternator for a vehicle according to the first embodiment of the present invention.

An alternator for a vehicle which is a first preferred embodiment of the present invention is hereinafter described with reference to FIG. 1. The basic structure of this alternator is as follows. A frame 1 is composed of a front frame 11 and a rear frame 12, and is tightened with plural fastening bolts 13. The frame 1 rotatably supports a rotating shaft 2 on which a Lundell-Rice type field core 31 is fixed. A field coil 32 is wound around the field core 31. The field core 31 and the field coil 32 compose a rotor.

An armature core 33 is fixed around the field core 31 in the inner periphery of the frame 1. An armature coil 34 is wound around the armature core 33. The armature core 33 and the armature coil 34 compose a stator.

A cylindrical cover 4 covers the rear end of the rear frame 12. Electric-parts-chamber S contains a rectifier 7 which is composed of a three-phase full-wave bridge of rectifier elements, a brush 8, and a regulator 9 and is formed between the rear frame 12 and the cover 4.

When an engine (not shown) drives the rotating shaft 2 by a pulley 21 and the field coil 32 is excited, three-phase AC voltage is generated in the armature coil 34 and rectified into DC voltage by the rectifier 7. A mixed flow fan 5 and a centrifugal fan 6 are installed at the front and the back of the field core 31 carried by the rotating shaft 2.

A plurality of outlets W' and W are radially disposed in series on the peripheral walls of the front frame 11 and the rear frame 12 surrounding the centrifugal fan 6, respectively. While the radial component of the wind generated by the mixed flow fan 5 cools the front coil end of the stator coil 34, it is blown off from the outlets W'. On the other hand, the axial flow component of the wind flows between each pole of the rotor core 31 in the axial direction and reaches the rear end of the rotor core 31 to be deflected in the radial direction by the disc portion of the centrifugal fan 6. It passes through the rear coil end of the stator coil 34 and flows along the inner periphery and the surfaces of the rear coil end into an air discharge passage P described below. While cooling the above-mentioned coil end, the wind is driven off from the outlets W.

Most of the wind Wi generated by the centrifugal fan 6 passes through the air discharge passage P between the surface of the rear coil end of the stator coil 34 and the inner edge surface of the rear frame 12, then it is driven off from the outlets W in the radially outward direction.

The main feature of the present invention is hereinafter explained in detail.

Air intakes 121 are formed in the wall end 120 of the rear frame 12 located at an inner portion by a predetermined distance from the outer peripheral edge of the rear frame 12. The air intakes 121 extend radially at substantially equal intervals to each other to introduce cooling wind to the rotor side. The cooling wind Wi blows from air inlets 40 formed at the bottom of the cover 4 to the inner periphery of the centrifugal fan 6 via the electric-parts-chamber S and the air intakes 121. After being accelerated by the centrifugal fan 6, the cooling wind Wi passes through the air discharge passage P and is driven off outside through the outlets W on the peripheral wall of the rear frame 12.

The rectifier 7 as the main feature of the present invention is hereinafter described with reference to an enlarged sectional view of the main portions shown in FIG. 2 and a plan view in FIG. 3.

Figure 3:
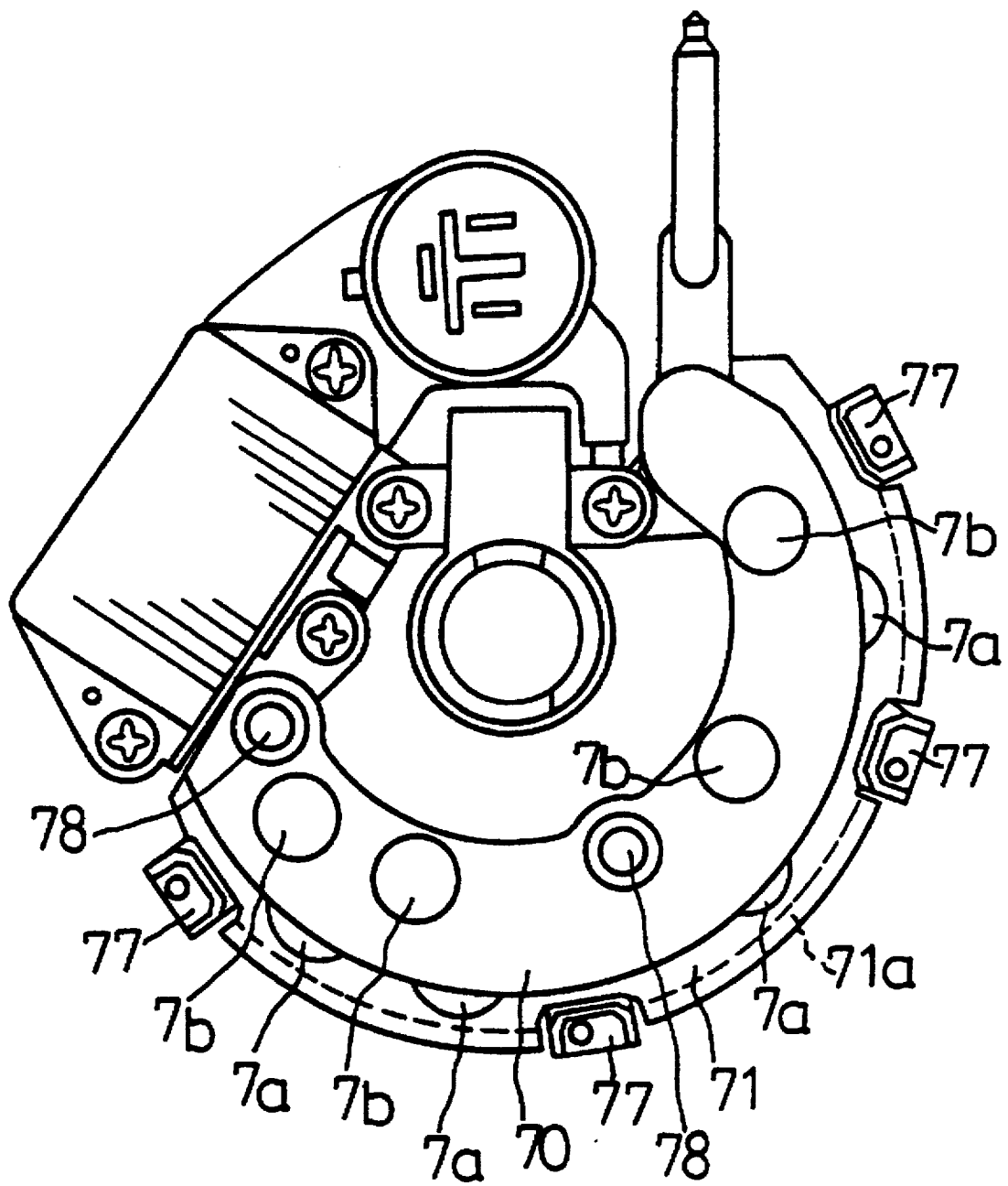
FIG. 3 is a plan view of the rectifier of the alternator shown in FIG. 1.

The rectifier 7 is composed of a three-phase full-wave rectifying-bridge having four positive and negative rectifying elements 7a and 7b shown in FIG. 3. The negative rectifying elements 7b include substantially can-shaped positive poles and a negative terminal protruding from the center of the opposite side of the can-shaped positive poles, and are press-fitted into holes bored in a semicircular negative side cooling fin 70. The positive rectifying elements 7a include can-shaped negative poles and a positive terminal protruding from the center of the opposite side of the can-shaped negative poles, and are fixed at the bottom plate of a substantially semicircular dish-shaped positive side cooling fin 71. Both cooling fins 70 and 71 function as conductive passages and radiating plates.

A pipe rivet 73 is fixed on a bolt 72 inserted horizontally from the end wall of the rear frame 12. A bush 74 made of resin, a positive side cooling fin (radiating plate) 71, a bush 76 made of resin, and a negative side cooling fin 70 are mounted on the pipe rivet 73 in this order. Then, a fixing hole (not shown) formed in the rear end of the cover 4 is placed on the bolt 72 so that the cover 4 is tightened by a nut 78. The above-mentioned structure allows both positive and negative side cooling fins 71 and 70 to be separated from each other as well as from the rear frame 12 and the bolt 72. The pipe rivet 73 serves as a ground electrode of the negative side cooling fin 70 and fixes bushes 74 and 76, and fins 70 and 71.

A cable sheath (protection cover) 77 in the shape of a cylinder formed integrally with the bush 74 protects and guides a lead wire 34e of the stator coil 34. The cable sheath 77 extends axially from the bush 74 to the stator coil 34. Particularly in this embodiment, a cylindrical extension 71a of the positive side cooling fin 71 extends axially to the air discharge passage P between the outer edge in the diametrical direction of the centrifugal fan 6 and the outlets W. In other words, a portion of the centrifugal fan 6 is disposed axially to overlap with the cylindrical extension 71a. A portion of the centrifugal fan 6 is also disposed axially to overlap with the rear coil end 34R of the stator coil 34. However, a predetermined space is provided axially between the edge surface of the rear coil end 34R of the stator coil 34 and the edge 71b of the positive side cooling fin 71 facing to the rear coil end 34R, so that the cooling wind Wi from the centrifugal fan 6 can be driven off through the outlets W. Furthermore, the inner periphery of the extension 71a of the positive side cooling fin 71 is located outside the inner periphery of the rear coil end 34R, so that sufficient space can be secured between the outer periphery of the centrifugal fan 6 and the inner periphery of the extension 71a. More specifically, the inner diameter L1 of the extension 71a of the cooling fin 71 is designed to be longer than the inner diameter L2 of the rear coil end 34R by a predetermined length (L1>L2).

Figure 5:
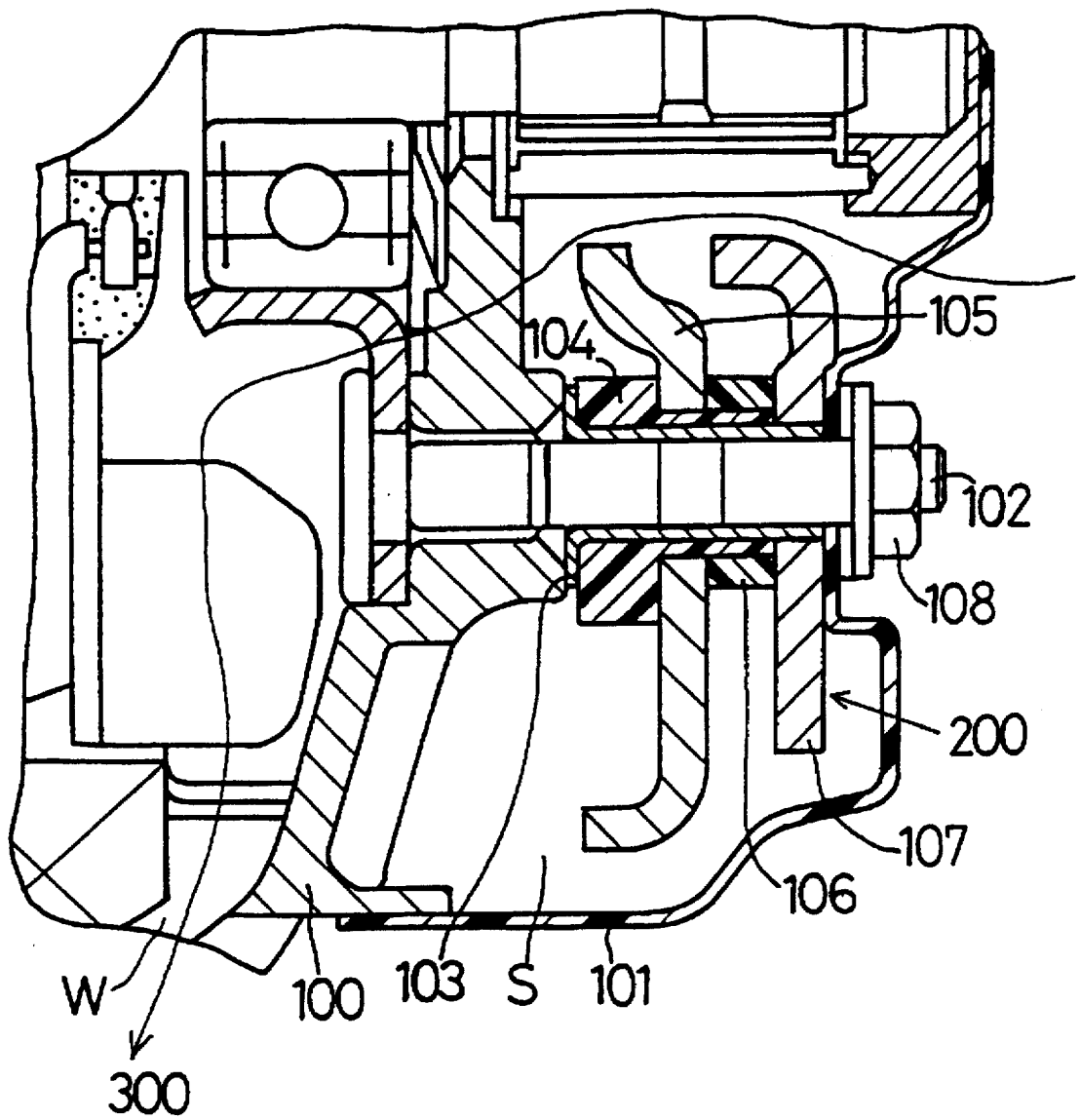
FIG. 5 is an enlarged sectional view of main portion of a conventional alternator with a built-in rectifier.

According to the first embodiment, since the cooling wind Wi is driven by the centrifugal fan 6 and collides with the extension 71a at a high speed, the extension 71a is cooled sufficiently. The cooling wind Wi is also designed to flow axially through the space between the radially inner edge of the rectifier 7 and the radially outer edge of the brush 8, which is quite different from a conventional embodiment shown in FIG. 5. That is, since both cooling fins 70 and 71 are not extended to this space, the resistance of the air blow can be reduced, and cooling performance of the rectifier 7 increases especially at the time of low rotational speed of the fan.

Securing a sufficient space between the positive side cooling fin 71 and the outer diameter portion of the centrifugal fan 6 by disposing the positive side cooling fin 71 externally can prevent wind noise from becoming loud, and can generate air turbulence, which remarkably improves cooling efficiency for the radiating plates.

Figure 4:
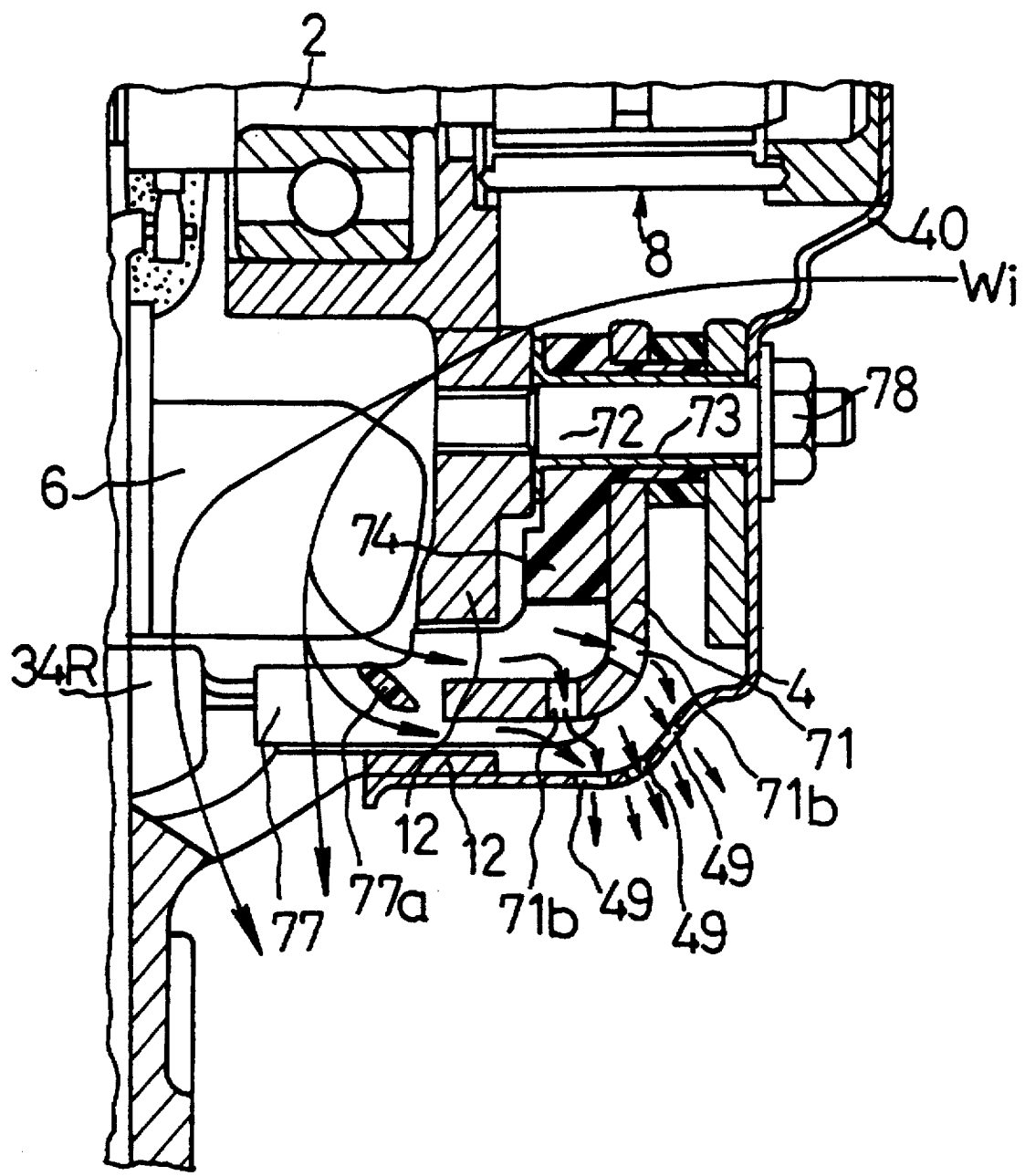
FIG. 4 is an enlarged sectional view of a main portion according to a modified embodiment of the present invention.

FIG. 4 shows a modified embodiment, in which a vane 77a is integrated with the cylindrical cable protection cover 77 to deflect the cooling wind instead of extending the cylindrical extension 71a of the positive side cooling fin 71.

The vane 77a can be formed around the centrifugal fan 6 in the shape of a ring or a semicircle. The vane 77a is diagonally disposed between the outer edge in the diametrical direction of the centrifugal fan 6 and the inner periphery of the circumferential wall of the rear frame 12 or outlets W and deflects a portion of the cooling wind Wi generated by the centrifugal fan 6 axially to the electric-parts-chamber S. The deflected cooling wind is driven out through a plurality of holes 71b of the positive side cooling fin 71 and small holes 49 of the cover 4. Accordingly, without extending the positive side cooling fin 71, cooling efficiency for the positive side cooling fin 71 can be improved.

Figure 2:
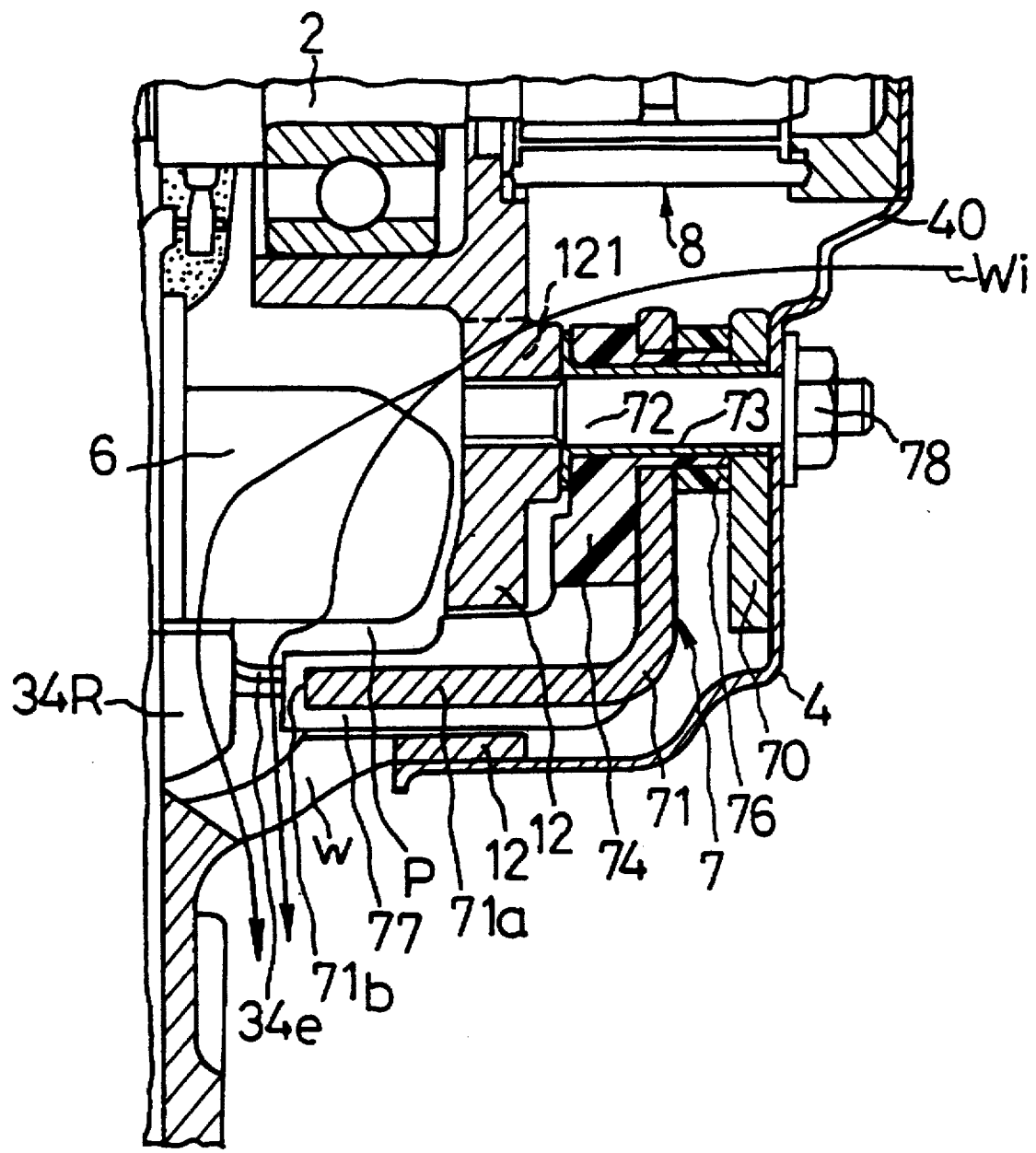
FIG. 2 is an enlarged sectional view of a main portion of the alternator shown in FIG. 1.

As another modified embodiment, a plurality of parallel cuts are formed axially in the cylindrical extension 71a shown in FIG. 2, and each parallel piece is twisted by a predetermined angle so that the wind driven out from the outlets W through the cut spaces between each parallel piece. The twist angle of the respective parallel pieces is almost parallel to the flow of the wind driven by the fan 6 to reduce the pressure loss thereby improving the cooling efficiency.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An alternator comprising:
   a housing having an end wall and a circumferential wall, said housing having air intakes formed on said end wall thereof and an air outlet formed on said circumferential wall thereof;
   a stator core fixed to said housing and having a stator coil wound therearound, said stator coil having a coil end protruding axially from said stator core;
   a rotor core supported rotatably by said housing inside said stator core;
   a cooling fan located within said housing, radially inwardly of said outlet and fixed on said rotor core to generate cooling wind in a radial direction; and
   a rectifier fixed to said housing and having a radiating plate to cool rectifying elements to rectify AC current generated in said stator coil into DC current, wherein
   said radiating plate of said rectifier has a cylindrical extension extending axially around said cooling fan, said cylindrical extension has an inner diameter larger than an inner diameter of said coil end of said stator coil so that a space is provided between an outer edge of said cooling fan and said cylindrical extension, and a space is provided between said coil end of said stator coil and said cylindrical extension, whereby said cooling wind blows on said cylindrical extension.

2. An alternator according to claim 1, wherein
   a portion of said cooling fan is disposed axially to overlap with said cylindrical extension; and
   said cylindrical extension is located between said cooling fan and said outlets.

3. An alternator according to claim 1, wherein
   a portion of said cooling fan is disposed axially to overlap with said coil end of said stator coil.

4. An alternator according to claim 1, wherein
   a space is provided in a radially inner portion of said rectifier to allow said cooling wind to pass therethrough.

5. An alternator according to claim 1, wherein
   a plurality of openings are provided on said cylindrical extension of said radiating plate to face said outlets of said housing.

6. An alternator according to claim 1, wherein
   said rectifier has a deflecting member for deflecting said cooling wind axially.

7. An alternator according to claim 6, wherein
   a cover is disposed to cover a rear end of said housing; and
   outlets for deflected cooling wind are formed on said cover.

8. An alternator according to claim 1, wherein
   a cover having a cylindrical portion is disposed to cover a rear end of said housing;
   said rectifier is fixed between said rear end of said housing and said cover; and
   said cylindrical extension of said radiating plate is axially extended longer than said cylindrical portion of cover.

9. An alternator comprising:
   a rotor having a centrifugal fan at one end thereof;
   a stator core disposed around said rotor and having an inner diameter larger than an outer diameter of said centrifugal fan;
   a housing having an air intake passage extending from an axially outside portion of said rotor to a central portion of said centrifugal fan and an air discharging passage from an outer periphery of said centrifugal fan to a radially outside portion of said rotor; and
   a rectifier fixed to said housing and having cooling fins and rectifier elements thermally connected to said cooling fins which are exposed to said air intake and air discharging passages;
   wherein said rectifier has a portion axially spaced from said centrifugal fan and extending in an arc formed around said air intake passage to be exposed thereto and a portion disposed radially outside said centrifugal fan to be exposed to said air discharging passage.

10. An alternator as claimed in claim 9, wherein said stator comprises a stator coil which is disposed axially to overlap with said centrifugal fan, and an outer periphery of said centrifugal fan extends in parallel with an inner periphery of said stator coil.

11. An alternator comprising:

a housing having an air intake formed on an end wall thereof and an air outlet formed on a circumferential wall thereof;

a stator core fixed to said housing and having a stator coil with a coil end protruding axially from said stator core;

a rotor core supported rotatably by said housing inside said stator core;

a cooling fan located inside said housing and fixed to said rotor core to generate cooling wind in a radial direction;

a rectifier fixed to said housing and having a radiating plate, said radiating plate having a cylindrical extension disposed between said cooling fan and said air outlet, said cylindrical extension having an inner diameter larger than an inner diameter of said coil end of said stator coil to provide a space between said cooling fan and said cylindrical extension.

12. An alternator according to claim 11, wherein a portion of said cooling fan is disposed axially to overlap with said cylindrical extension.

13. An alternator according to claim 12, wherein a portion of said cooling fan is disposed axially to overlap with said coil end of said stator coil.

14. An alternator according to claim 11 further comprising a member, disposed between said cooling fan and said air outlet, for deflecting cooling window.

* * * * *